Dec. 11, 1951  W. J. HUGHES  2,577,967
DIAPHRAGM VALVE

Filed July 30, 1947  2 SHEETS—SHEET 1

INVENTOR.
Walter J. Hughes,
BY
atty.

UNITED STATES PATENT OFFICE 2,577,967

DIAPHRAGM VALVE

Walter J. Hughes, Chicago, Ill., assignor to Infilco Incorporated, Chicago, Ill., a corporation of Delaware Application July 30, 1947, Serial No. 764,765

5 Claims. (Cl. 137—139)

This invention relates to diaphragm valves. More specifically the invention is concerned with a differential type diaphragm valve.

It is an object of this invention to provide an improved differential type double diaphragm valve.

Another object of the invention is to provide a valve which is especially suitable for use in a by-pass, where pressures on both sides of the valve are substantially equal.

Another object of the invention is to provide a diaphragm valve wherein the loop of the diaphragm is in its molded shape when in one extreme position and when distorted to the opposite extreme position from its molded shape the loop of the diaphragm is crimped or compressed rather than stretched from a smaller to a larger diameter.

Another important object of the invention is the confinement of the loops of the diaphragms between vertical surfaces such that the radius of the loop remains substantially constant in all positions of travel and the stresses therein due to pressure against the loop also remain substantially constant and computable.

Another object is to provide a diaphragm valve which tends to open to a medium or neutral position independently of any opening force acting, so that only a small force is needed to move the valve from half open to fully open position, or from half open to fully closed position.

Still another object is to provide a diaphragm valve having a valve port of equal diameter with the line in which it is interposed and wherein the diaphragm may be deflected by an amount equal to one-fourth of the port seat diameter so that in the fully open position the valve opening is of the same area as that of the line.

Other objects of the invention will become apparent from a study of the description which follows.

The valve of my invention belongs to the type utilizing two diaphragms of differential effective areas, the two diaphragms being joined together in spaced relationship and forming a valve chamber which is vented to atmosphere. When pressure equal to line pressure is applied to the outer side of the larger operating diaphragm of such a valve, the valve is held firmly on its seat against line pressure because of the lesser effective area of the valve diaphragm; when the pressure on the operating diaphragm is released, line pressure on the outer side of the valve diaphragm will open the valve.

One of the main uses of such a valve is in a by-pass line, such as the wash water conduit of a filter, where pressures on the inlet and outlet side of the valve are substantially equal, and line pressure on the operating diaphragm will serve to hold the valve in tightly closed position. However, the use of the valve is not restricted to that of a by-pass valve, for certain qualities make it very suitable for other uses.

My invention will be more readily understood by reference to the drawings wherein.

Figure 1:
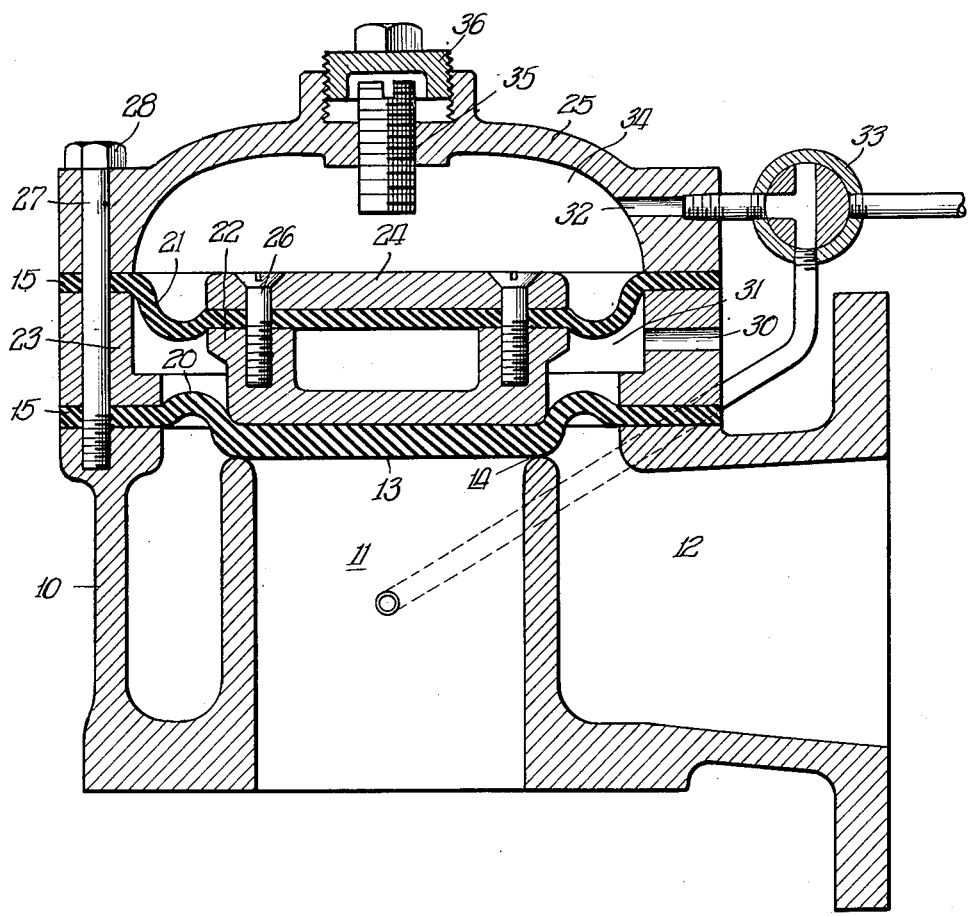
Figure 1 is a cross-sectional view of a preferred embodiment of a valve according to my invention.

The valve of my invention may comprise a body, or casing, 10 having an inlet passage 11, an outlet passage 12, a valve port 13 with port seat 14 between the inlet and the outlet, and a diaphragm assembly 15 operable for closing and opening the port 13. The diaphragm assembly 15 comprises a valve diaphragm 20, which in Figure 1 is shown as closing the port 13, and an operating diaphragm 21 spaced from the valve diaphragm 20 by a central spacer 22, and by a peripheral differential spacer ring 23, a diaphragm plate 24 and a cover 25 over the operating diaphragm. The diaphragm plate 24, the operating diaphragm 21, and the spacer 22 are fastened together by any suitable means, such as screws 26, as shown. The cover 25, operating diaphragm 21, spacer ring 23, and valve diaphragm 20 are attached to the housing 10 by any suitable means, such as studs 27 and nuts 28. In this manner the valve diaphragm is firmly clamped with its peripheral portion between the upper edge of the housing and the spacer ring 23, and the operating diaphragm is peripherally fastened between the spacer ring 23 and the cover 25.

As clearly shown in Figure 1, the spacer ring 23 is of such shape that the effective area of the operating diaphragm 21 is larger than that of the valve diaphragm 20. The spacer ring 23 is provided with a drilled hole 30 to vent to atmosphere the diaphragm chamber 31 which is formed between the two diaphragms. The cover 25 is provided with a suitable port 32 which may be connected to any suitable source of pressure fluid. Where line pressure is used as source of operating pressure the port 32 may be connected to the inlet line 11 through a three-way pilot valve 33, which in one position will connect pressure chamber 34 to line pressure, as shown, and in its other position to atmosphere.

A stop screw 35 may be provided in the cover 25, and may be enclosed by a removable hollow plug 36. By proper setting of the stop screw 35 the opening of the valve can be limited or the valve, if desired, may be held closed against usual hydraulic operation.

In operation, when line pressure is admitted to chamber 34 through three-way valve 33 and port 32 the valve will be held closed with a force which is the product of the difference in the effective area of the two diaphragms, 20 and 21, and the line pressure.

The valve structure so far described is known in the art and not claimed per se, but only in connection with the improvement in the diaphragm assembly to be described below which provides improved operation of a valve of this type. The diaphragm assembly of my valve is different from those heretofore used in various respects and these differences influence both the durability of the diaphragms and the operation of the valve.

The diaphragms 20 and 21 are made of rubber, neoprene or a similar flexible material, as usual. Such diaphragms are exposed to rather high pressures. Usually the design is such that at normal line pressures the valve diaphragm will be depressed against the port seat with a force of about 30 to 50 pounds per circumferential inch of the seat when the inlet, the outlet and the pressure chamber are under line pressure. Even when made of relatively thick material the diaphragms of the prior art have been frequently ruptured due to the great stresses to which they are subjected in such a valve. To avoid this drawback, my diaphragms are molded in the shape which they assume when distended. Therefore, when distorted from the molded shape they are compressed rather than stretched.

Figure 2:
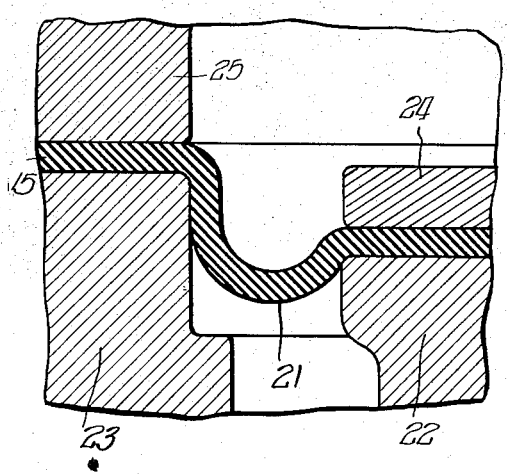
Figures 2 and 3 are partial sectional views, on an enlarged scale, of the operating diaphragm of the valve in the closed and the fully open position, respectively.
Figure 4:
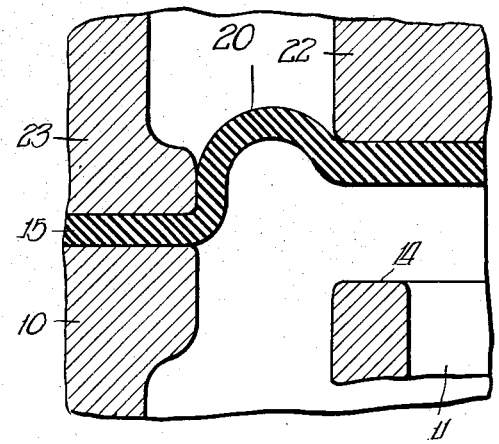
Figures 4 and 5 are partial sectional views, on an enlarged scale, of the valve diaphragm of the valve in the fully open and the closed position, respectively.
Figure 3:
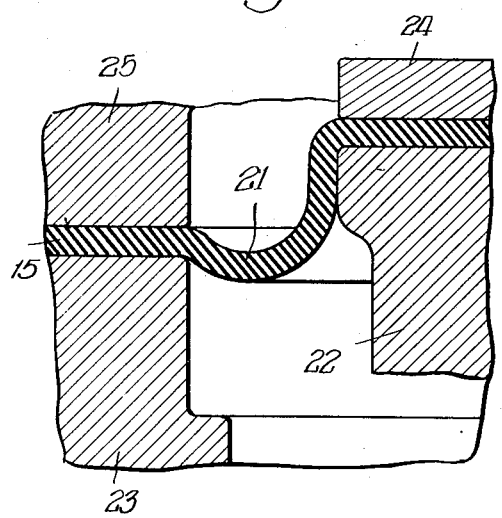
Figure 5:
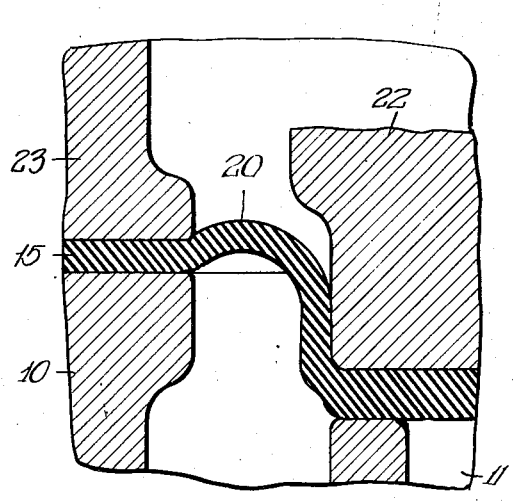

Figures 2 to 5 show the shape of the operating and valve diaphragms in their two end positions, i. e. in fully closed and fully opened position, Figure 2 and Figure 5 showing the two diaphragms when the valve is fully closed, as shown in Figure 1. The operating diaphragm 21 is molded in the shape shown in Figure 2, which it will assume when it is distended by pressure from pressure chamber 34 to close the valve port 13. The molded shape of the valve diaphragm 20 is that shown in Figure 4 which it will assume when distended by inlet pressure to open the valve port. It is thus seen that each diaphragm assumes its molded shape when it is under stress. When distorted from its molded shape by opening movement of the valve, the operating diaphragm is rolled inwardly similar to a stocking being turned outside in, whereby any stretching from a smaller to a larger diameter is avoided. The same is true of the valve diaphragm, when it is distorted from its molded shape (corresponding to wide open valve position) to valve closing position.

Thus it will be seen that neither of the two diaphragms is at any time exposed to stretching beyond its molded form. This is important, since the diaphragms are exposed to high pressures.

The loops of the two diaphragms are confined between vertical surfaces provided by spacer 22 and diaphragm plate 24 and by spacer ring 23 and cover 25, as shown. The radius of the loop remains therefore substantially constant in all position of travel. Consequently, also the stresses to which the loops are subjected due to pressure remain substantially constant and computable.

The two diaphragms are fastened together with their loop portions opposing each other. Since the diaphragms are made of relatively thick material the result of such opposing assembly of the two diaphragms is that the stiffness of the diaphragm materials causes one to oppose the other in movement, whereby both tend to take a medium position in which the valve is about half open. In other words, with no force applied on either side of the diaphragm assembly, the diaphragms tend to take a mid position. When pressure is applied to the valve diaphragm 20 to open the valve the force with which the valve diaphragm opposes this pressure diminishes as the diaphragm 20 moves to the open position which corresponds to its molded shape. On the other hand, the operating diaphragm 21 resists the opening movement with a force increasing from zero at closed valve position, which corresponds to its molded shape, to fully open position, in which it is in its fully compressed shape. The result is, that when operating pressure is cut off and the pressure chamber 34 connected to atmosphere, the valve will open half way without any force being applied, and only a very slight pressure is needed to move it further to the fully open position. Since the pressure required is much less than ordinary line pressure, loss of head across the valve is practically reduced to the friction losses inherent in flow through the valve body passages. Where only small initial flows are available for opening the valve, this tendency of the diaphragm assembly to move to half open position is very advantageous.

The usual loss of head across a valve is further reduced in my construction by the dimensioning of the various parts of the valve. The valve port 13 has substantially the same diameter as the inlet line 11. In fully open position the valve diaphragm 20 is lifted from the port seat 14 a distance equal to one-fourth of the port diameter which provides a valve opening of the same area as the inlet line. This considerable lifting of the diaphragms is permissible because at this end position the valve diaphragm will be in its molded form and the operating diaphragm rolled inwardly to its most compressed shape, so that no stretching of the material beyond the molded shape occurs.

It will thus be seen that I provide a valve which is simple and cheap in construction, yet very durable, and which reduces loss of head across the valve to a minimum due to friction, as it needs only a negligible force for opening and provides a practically unrestricted flow passage from inlet to outlet.

Various modifications of the valve described will suggest themselves to those skilled in the art. Accordingly, I do not wish to limit myself to the exact structure shown and described for exemplification, but not for limitation.

I claim:

1. A valve comprising a housing, an inlet into said housing, an outlet from said housing, a port interposed between said inlet and said outlet, and a valve assembly associated with said port, said assembly comprising a valve diaphragm cooperating with said port and an operating diaphragm of larger effective area than the valve diaphragm, each of said diaphragms having a molded loop portion, said diaphragms being fastened to each other in spaced relationship in such manner that the loop portions extend into the space between them, a vent from said space, and means for selectively applying line pressure and atmospheric pressure to the outer side of said operating diaphragm, characterized in that the loop portion of the valve diaphragm is molded in the shape it assumes when the valve is in the fully open position and the loop portion of the operating diaphragm is molded in the shape it assumes when the valve is in the fully closed position and each of said loop portions is so constructed and mounted as to be rolled inwardly to a compressed shape when the respective diaphragm is distorted from its molded shape by opening or closing of the valve.

2. A valve comprising a housing, an inlet into said housing, an outlet from said housing, a port seat between said inlet and said outlet and of a diameter equal to the diameter of the said inlet, a differential diaphragm assembly associated with said port seat, said assembly comprising a valve diaphragm, an operating diaphragm of larger effective area than said valve diaphragm and operable when under pressure to hold said valve diaphragm tightly on said port seat, said diaphragms being fastened together in spaced relation, and means for applying pressure to said operating diaphragm to close said valve and for releasing said pressure to open said valve, said diaphragms being so molded and so installed that said valve diaphragm is lifted from said port seat one-fourth the diameter of said port seat in the fully open position, and that it is in its molded shape when in said fully open position, and the operating diaphragm is in its molded shape in the fully closed position, and that both diaphragms will roll inwardly to a compressed shape when distorted from their molded shape.

3. In a differential diaphragm valve, a valve diaphragm and an operating diaphragm in spaced relationship to, and cooperating with, said valve diaphragm and operative while under pressure to hold said valve diaphragm in valve closing position and upon release of pressure thereon to permit said valve diaphragm to open said valve, said diaphragms being molded so that their molded shapes correspond to their positions under stress and that they are rolled inwardly and compressed when distorted from their molded shape, said diaphragms being sufficiently thick and so fastened together and installed that each diaphragm opposes the movement of the other diaphragm, whereby, when no pressure is applied to either diaphragm, they tend to take a mid position between their molded form and their compressed form.

4. A differential diaphragm valve including a valve housing having an inlet and an outlet, a port interposed between the inlet and the outlet, and a differential diaphragm assembly associated with said port, said diaphragm assembly comprising a valve diaphragm for cooperation with said port and having a loop portion molded in the shape of its extreme valve opened position, an operating diaphragm of larger effective area and having a loop portion molded in the shape of its extreme valve closed position, said diaphragms being fastened to each other in spaced relationship to form said differential diaphragm assembly with their loop portions opposing each other, whereby pressure on either side of the assembly moves one of said diaphragms toward its molded shape and the other of said diaphragms toward a compressed shape.

5. In a differential diaphragm valve, a valve diaphragm molded in the shape corresponding to its extreme valve open position, an operating diaphragm of larger effective area than, and in spaced relationship to, and cooperating with, said valve diaphragm, said operating diaphragm being molded in the shape corresponding to its valve closed position, said diaphragms being fastened together in opposed relationship with respect to their molded shapes and being sufficiently stiff that each diaphragm opposes movement of the other to its molded shape.

WALTER J. HUGHES.

REFERENCES CITED

The following references are of record in the file of this patent:

UNITED STATES PATENTS

| Number | Name | Date |
| --- | --- | --- |
| 1,471,504 | Myer | Oct. 23, 1923 |
| 1,619,948 | Mangiameli | Mar. 8, 1927 |
| 2,380,983 | Mock | Aug. 7, 1945 |

FOREIGN PATENTS

| Number | Country | Date |
| --- | --- | --- |
| 1,024 | Great Britain | Mar. 14, 1878 |
| 14,235 | Germany | July 1, 1881 |
| 813,841 | France | Mar. 8, 1937 |